United States Patent [19]

Omoto et al.

[11] 4,008,207
[45] Feb. 15, 1977

[54] PROCESS FOR PREPARING POLYESTERS FOR OPAQUE FILM USE

[75] Inventors: Yorihiko Omoto; Teruo Matsunaga, both of Matsuyama, Japan

[73] Assignee: Teijin Limited, Osaka, Japan

[22] Filed: May 5, 1975

[21] Appl. No.: 574,733

[30] Foreign Application Priority Data

May 11, 1974 Japan .............................. 49-51744

[52] U.S. Cl. ........................... 260/75 R; 260/475 P
[51] Int. Cl.² ...................................... C08G 63/14
[58] Field of Search ..................... 260/75 R, 475 P

[56] References Cited

UNITED STATES PATENTS

| | | | |
|---|---|---|---|
| 3,847,873 | 12/1974 | Jackson et al. ................. | 260/75 R |
| 3,907,754 | 9/1975 | Tershansy et al. .............. | 260/75 R |

FOREIGN PATENTS OR APPLICATIONS 2,259,043  6/1973  Germany .......................... 260/75 R

*Primary Examiner*—Lucille M. Phynes
*Attorney, Agent, or Firm*—Wenderoth, Lind & Ponack

[57] ABSTRACT

A process for preparing a polyester by carrying out the ester-interchange reaction of a lower alkyl ester of terephthalic acid and a glycol in the presence of a calcium compound and a lithium compound having ester-interchange catalysis capacities in amounts satisfying all of the following relationships:

$0.03 \leq Ca \leq 0.50$  (1)

$0.10 \leq Li \leq 0.80$  (2)

$0.30 \leq 0.5\ Ca + Li \leq 1.00$  (3) and $0.10 \leq \dfrac{P}{0.5\ Ca + Li} \leq 0.55$  (4)

wherein Ca, Li and P are respectively the mol percentages of calcium, lithim and phosphorus compounds based on the lower alkyl ester of terephthalic acid, thereafter adding to the reaction system a phosphorus compound of the formula

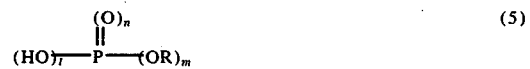 (5)

wherein R is a member selected from the group consisting of the alkyl, aryl and hydroxyalkyl groups, n is selected from the class consisting of 0 to 1, 1 is a whole number up to 2, including O, m is a whole number from 1 to 3, with the proviso that the sum of 1 and m is 3, in an amount satisfying said relationship (4), the addition being made at a point in the process up until completion of said polycondensation reaction, and thereafter effecting the polycondensation reaction of the resulting product.

4 Claims, No Drawings

PROCESS FOR PREPARING POLYESTERS FOR OPAQUE FILM USE

This invention relates to a process for preparing polyesters for opaque film use and, in particular, to a process for preparing polyesters suitably used for opaque films for electrical insulation use and in which the scrap films that result at the time of making the film can be readily reclaimed.

The films made from polyesters, e.g. polyethylene terephthalate, are satisfactory with respect to both their transparency and color tone as well as possess numerous excellent physical properties, and hence the demand for these films are showing a year-by-year increase. However, in concomitance with this increase in demand, the film is being required to possess various other properties to meet the requirements of the particular use to which it is to be put. For example, when the film is to be used for electrical insulation purposes, especially as a slot liner of motors, in addition to its possession of superior heat-resistant and electrical insulation properties, the film is especially required to possess the following properties. It must be lubricious, it must be such that delamination (interlaminal peeling of the portion being processed at the time of molding of the product) does not take place, and for facilitating the checking operation after assembly as an insulating material, it must be opaque.

In manufacturing the aforesaid polyester film, e.g. the polyethylene terephthalate film, the usual process consists of heating a lower alkyl ester of terephthalic acid such as dimethyl terephthalate and ethylene glycol to effect the ester-interchange reaction, followed by polycondensing the ester-interchange reaction product by heating it under reduced pressure to obtain a polyester which, after being rendered into chip form, is melt-extruded into film form and thereafter biaxially drawn. However, there occur thickness and drawing irregularities at both edges in the lateral direction in the case of this drawn film. Hence, both edges are cut off and only the uniform portion is wound up as the final product film. The scrap film cut off in this manner amounts to as much as 20 – 40% by weight of the whole film. Thus, unless this scrap film is effectively utilized, the commercial production of the film cannot be carried out profitably. Usually, this scrap film is again rendered into chip form and is used mixed with the chips that have been prepared from the polyester obtained immediately after completion of the polycondensation reaction. (Hereinafter, the chips prepared from the scrap film will be referred to as reclaimed chips, while the chips prepared from the polyester obtained immediately after the completion of the polycondensation reaction will be referred to as fresh chips.)

In carrying out the foregoing ester-interchange and polycondensation reactions, catalysts are used for accelerating the reactions. For example, in wide use as the ester-interchange catalysts are the calcium and manganese compounds, while as the polycondensation catalysts widely used are the antimony and germanium compounds. The films obtained from the polyesters prepared by using these catalysts excel in their electrical insulation and delamination-resistant properties, but their heat resistance and lubricity are not fully satisfactory. Furthermore, they are unsuitable for use as slot liners, because they are transparent.

As a process for preparing polyesters that provide films not having these drawbacks, there has been suggested heretofore a process wherein various finely divided particles are incorporated in the polyester. As such a process, known are (1) that of mixing in such inorganic inert finely divided particles such as talc and clay, and (2) that of adding a phosphorus compound to the reaction system at the time of preparing the polyester and forming the finely divided particles in the polyester by the interaction of said phosphorus compound and the catalyst (metal compound). However, these known processes, as hereinafter described, were not necessarily satisfactory as far as the lubricity and opaqueness of the film were concerned.

In the foregoing process (1) the polyester frequently contained coarse particles due to the difficulty involved in comminuting the finely divided particles to be incorporated as well as the aggregation that takes place between the particles. Again, there frequently occurs a dropping off of the particles due to the lack of affinity between the polyester and the finely divided particles that are incorporated, with the consequence that the film tends to break at the time of its formation. Further, the film not only is unsatisfactory with respect to its lubricity and opaqueness but also tends to become delaminated. On the other hand, while it is possible to prepare finely divided particles of uniform particle size in the case of the foregoing process (2), there is a limit to the amount of the finely divided particles that can be incorporated. Hence, it is not possible to obtain a film having sufficient opaqueness. Further, when reclaimed chips are used in this process (2), the resulting film tends to become delaminated, and its opacity also shows a great decline.

In German Laid-Open Patent Application No. 2,259,043 there is disclosed that the lithium element is mixed with the polyester for obtaining polyester fibers and films having superior lubricity and opaqueness. And in one of examples therein, methyl 2,6-naphthalenedicarboxylate and ethylene glycol are reacted using calcium acetate as the ester-interchange catalyst, and at the point of the completion of the ester interchange lithium iodide and triphenyl phosphite are added to the reaction system. However, in the case of a polyester obtained by such a process the opacity of the film is not entirely satisfactory. Moreover, when a film is made from the reclaimed chips, there is the shortcoming that not only is there a decline in opacity, but also the film tends to become delaminated. Furthermore, in the process for preparing polyester disclosed in this German application, since only calcium acetate is used as the ester-interchange catalyst and the lithium compound is added after the completion of the ester-interchange reaction, a relatively long period of time is required for the ester-interchange reaction. In addition, since there is much formation of catalyst scales (foreign matter), it becomes impossible to carry out the production operation continuously. When a film is prepared using polyester chips containing a great amount of such foreign matter, various troubles occur in the drawing step.

An object of the present invention is to provide a polyester having superior delamination-resistant, heat-resistant and electrical insulating properties and in which the step of making a polyester film therefrom involves no troubles and in which the reclamation of the scrap film can be carried out with ease.

Another object of the invention is to provide a process by which the foregoing polyester can be prepared without involving any troubles in the process of its preparation.

Other objects and advantages of the invention will become apparent from the following description.

We found that the foregoings objects of the invention could be achieved by specifying the class of the catalyst, its amount and the period of its addition.

Thus, there is provided in accordance with the present invention a process for preparing a polyester for opaque film use wherein preparing a polyester by the ester-interchange reaction of a lower alkyl ester of terephthalic acid and a glycol followed by a polycondensation reaction of the resulting product, said ester-interchange reaction is carried out in the presence of a calcium compound and a lithium compound having ester-interchange catalysis capacities in amounts satisfying all of the following relationships:

$$0.03 \leq Ca \leq 0.50 \qquad 1.$$

$$0.10 \leq Li \leq 0.80 \qquad 2.$$

$$0.30 \leq 0.5Ca + Li \leq 1.00 \qquad 3.$$

and $$0.10 \leq \frac{P}{0.5\,Ca + Li} \leq 0.55 \qquad (4)$$

wherein Ca, Li and P are respectively the mol percentages of calcium, lithium and phosphorus compounds based on the lower alkyl ester of terephthalic acid, and thereafter adding to the reaction system a phosphorus compound of the formula

wherein R is alkyl, aryl or hydroxyalkyl group, $n$ is 0 or 1, $l$ is 0, 1 or 2, and $m$ is 1, 2 or 3, with the proviso that the sum of $l + m$ is 3, in an amount satisfying the foregoing relationship (4), the addition being made at a point in the process up until completion of said polycondensation reaction.

As the lower alkyl ester of terephthalic acid to be used in this invention, those in which the alkyl group contains 1 – 4 carbon atoms are conveniently used. The lower alkyl ester of terephthalic acid may be substituted in part by the lower alkyl esters of other dicarboxylic and hydroxycarboxylic acids. For example, the lower alkyl esters of such acids as isophthalic acid, phthalic acid, 2,6-naphthalenedicarboxylic acid, 1,5-naphthalenedicarboxylic acid, 2,7-naphthalenedicarboxylic acid, p-hydroxyethoxybenzoic acid, adipic acid and 6-hydroxy-betanaphthoic acid may be substituted for a part of the aforesaid lower alkyl ester of terephthalic acid. Needless to say, in this case the mol % of the aforesaid calcium, lithium, and phosphorus compounds is meant to be the mol% based on the total of the lower alkyl ester of terephthalic acid and the lower alkyl esters of the other dicarboxylic or hydroxycarboxylic acids.

On the other hand, while ethylene glycol is conveniently used as the glycol, a part or all of the ethylene glycol may be substituted by such glycols as, for example, trimethylene glycol, tetramethylene glycol, hexamethylene glycol and cyclohexanediol.

In carrying out the ester-interchange reaction between the lower alkyl ester of terephthalic acid and the glycol in this invention, the aforementioned calcium, lithium and phosphorus compounds used as catalysts for this reaction must be used in such amounts as will satisfy all of the aforesaid relationships (1) – (4). If all of these relationships are not satisfied, films having opacity and good delamination-resistant, heat-resistant and electrical insulating properties cannot be obtained even from the fresh chips not to mention the reclaimed chips. That is to say, when Ca<0.03, even though the relationships (2), (3) and (4) are satisfied, the delamination resistance and heat resistance of even the film obtained from the fresh chips are poor and, in addition, the film is colored yellow.

When Ca>0.50, even though the relationships (2), (3) and (4) are satisfied, there is formed much scales due to the catalysts during the polycondensation reaction, with the consequence that there is the necessity of cleaning the polycondensation reactor frequently. Moreover, in the resulting film the scales becomes admixed as foreign matter, which not only aggravates the film's drawability as well as greatly reduces its merchandise value.

When Li<0.10, even though the relationships (1), (3) and (4) are satisfied, the opacity and delamination resistance of even the film obtained from the fresh chips are poor.

When Li>0.80, even though the relationships (1), (3) and (4) are satisfied, there is much formation of catalyst scales during the polycondensation reaction to make it impossible to continue the production operation.

When (0.5 Ca + Li)<0.3, even though the relationships (1), (2) and (4) are satisfied, the opacity and delamination resistance of even the film obtained from the fresh chips are poor.

When (0.5 Ca + Li)>1.00, even though the relationships (1), (2) and (4) are satisfied, there is the formation of much catalyst scales during the polycondensation reaction to make it impossible to continue the production operation.

$$\text{When } \frac{P}{0.5\,Ca + Li} < 0.10,$$

even though the relationships (1), (2) and (3) are satisfied, the heat resistance of even the film obtained from the fresh chips is poor, and the electrical insulating property is inferior. In addition, there is much formation of catalyst scales during the polycondensation reaction to make it impossible to continue the production operation.

$$\text{When } \frac{P}{0.5\,Ca + Li} > 0.55,$$

even though the relationships (1), (2) and (3) are satisfied, even the film obtained from the fresh chips is inferior in its opacity and delamination resistance.

In a most preferred embodiment of this invention, the amounts used of the calcium, lithium and phosphorus compounds are chosen so as to satisfy all of the following relationships:

$$0.05 \leq Ca \leq 0.40 \qquad (1')$$

$$0.20 \leq Li \leq 0.60 \qquad (2')$$

$$0.35 \leq 0.5\,Ca + Li \leq 0.80 \qquad (3')$$

and $$0.10 \leq \frac{P}{0.5\,Ca + Li} \leq 0.55 \qquad (4).$$

There is imposed particular restriction as to the calcium compound that is to be used in this invention as long as it is one possessing an ester-interchange capacity. As examples, mention can be made of the salts of aliphatic carboxylic acids such as acetic acid, propionic acid and butyric acid; the salts of aromatic carboxylic acids such as benzoic acid, p-methylbenzoic acid and naphthoic acid; the alcoholates of alcohols such as methyl alcohol, ethyl alcohol, propyl alcohol and butyl alcohol; the glycolates of glycols such as ethylene glycol and propylene glycol; and the chloride. An especially suitable catalyst is calcium acetate.

Further, there is imposed no particular restriction as to lithium compound either. Examples include the salts of such aliphatic carboxylic acids as acetic acid, propionic acid and butyric acid; the salts of such aromatic carboxylic acids as benzoic acid, p-methylbenzoic acid and naphthoic acid; the alcoholates of such alcohols as methyl alcohol, ethyl alcohol and propyl alcohol; and chloride and hydride. Of these, especially to be preferred is lithium acetate.

As the phosphorus compound, the ester or partial ester of phosphoric or phosphorous acid as shown by the the foregoing formula (5) is chosen. A preferred phosphorus compound is that in which the R in the formula (5) is either an alkyl group of 1 – 4 carbon atoms, an aryl group of 6 – 10 carbon atoms or a hydroxyalkyl group of 2 – 10 carbon atoms. As specific examples, there can be named such compounds as monomethyl phosphate, dimethyl phosphate, trimethyl phosphate, triethyl phosphate, triphenyl phosphate, monomethyl phosphite, dimethyl phosphite, trimethyl phosphite, triphenyl phosphite, dimethylhydroxyethyl phosphite, etc., which may also be used as mixtures of two or more thereof. Of these, especially preferred is trimethyl phosphate. In the case where, instead of the ester or partial ester of phosphoric acid or phosphorous acid of formula (5), other compounds, for example, phosphoric acid or phosphorous acid, are used, even the film obtained from the fresh chips is inferior in its opacity and delamination resistance, even though the amount used of such a compound satisfies the relationships (1), (2), (3) and (4).

There is imposed no particular restriction as to when the aforesaid phosphorus compound is added. However, when it is added before the completion of the ester-interchange reaction, there is a tendency to a reduction in the catalytic capacity of the calcium and/or lithium compound used as the ester-interchange catalyst. Hence, it is preferred to make the addition at the point that the ester-interchange reaction has been substantially completed, after which the polycondensation reaction is carried out. Needless to say, the phosphorus compound may be added incrementally, and as long as the ester-interchange reaction is not impeded, its incremental addition may be started before the completion of the ester-interchange reaction.

The catalyst to be used in the polycondensation reaction of this invention can be optionally chosen. Preferably used are usually the antimony catalysts (e.g., antimony trioxide, antimony chloride, antimony acetate, antimony glycolate, antimonic acid and the salts thereof, and antimony phosphate), the germanium catalysts (e.g., germanium dioxide) and the titanium catalysts (e.g., titanium dioxide and titanium tetrapropoxide). These polycondensation catalysts are usually used in an amount of 0.01 – 0.3 mol% based on the lower alkyl ester of terephthalic acid (or the total of the lower alkyl ester of terephthalic acid and its substituent product, i.e. the lower alkyl ester of other dicarboxylic acids or hydroxycarboxylic acids). These polycondensation reaction catalysts may be added in advance at the time of the ester-interchange reaction.

For further enhancement of the opacity of the resulting film, conjoint use of inorganic inert finely divided particles such as clay may be made. However, if too much of these finely divided particles are used, the delamination resistance of the resulting film suffers. Hence, they are usually used in an amount about 0.01 – 0.2% by weight based on the polyester.

The film obtained by the invention process contains precipitated particles consisting of the calcium, lithium and phosphorus compounds used and the oligomer of ethylene terephthalate, the constituent component of polyester, and it is believed that the desired opacity is thus obtained. This is inferable, because when the polyester prepared by the invention process was dissolved in orthochlorophenol, and the precipitated particles were separated with a centrifuge followed by washing the separated particles in orthochlorophenol and, after drying the particles, the particles were submitted to elemental analysis and an infrared spectrum analysis, the several elements of calcium, lithium and phosphorus and the oligomers believed to be trimer and tetramer of ethylene terephthalate were observed in the particles.

The film made from the polyester obtained by the invention process, as hereinbefore indicated, possesses not only a desirable opacity but also excels in lubricity and delamination resistance as well as in its heat resistance, mechanical strength and electrical insulating property. In addition, even though the reclaimed chips obtained from the scrap film that results when making the film from the invention polyester are mixed and reused with the fresh chips, there is practically no decline in the foregoing properties of the resulting film, especially its opacity and delamination resistance. Hence, the present invention makes it possible to provide very economically a most suitable film for electrical use, especially as an electrical insulating film for use as a slot liner of motors.

Further, the film made from the polyester obtained by the invention process can not only be used as an insulating material for use with slot liners of motors but also be used for a wide variety of other purposes wherein its superior properties can be utilized. For example, it can be advantageously used for such other purposes as condensers, electrical covering uses and dielectrics of transformers, etc.

The present invention is more specifically illustrated in the following examples, in which the parts are on a weight basis.

The various physical properties mentioned in the examples are defined as follows:

$[\eta]$ is the intrinsic viscosity obtained from a value measured at 30° C. on a 0.5% by weight solution of the polyester in orthochlorophenol.

The delamination resistance of the film is awarded one of three grades: Grade 1 being that in which no delamination takes place, Grade 3 being that in which delamination takes place readily, and Grade 2 being that coming in between the foregoing grades in performance. Only the film rated Grade 1 qualifies for use as slot liners.

The color of the film is awarded one of four grades: Grade 1 being that which is completely transparent, Grade 2 being that which is somewhat opaque but not sufficiently opaque, Grade 3 being that which exhibits sufficient whiteness and opaqueness, and Grade 4 being that which having been discolored to yellow and hence does not possess any merchandise value. Only those rated Grade 3 are considered as being acceptable.

The turbidity of the film is measured in accordance with the ASTM Method D-1003, the measurement being made on a film sample having a thickness of 75 microns using a SEP-H Model H.T.R. Meter (manufactured by Nippon Seimitsu Kagaku Co.). A film having a turbidity of at least 30% is considered as being acceptable.

The static friction coefficient of the film is measured in accordance with the ASTM Method D-1894, the measurement being made on a film sample of 75-micron thickness using a slip tester (manufactured by Toyo Tester Co.). A film having a static friction coefficient of not more than 0.40 is considered as being acceptable.

The volume resistivity is measured in accordance with the ASTM Method D-257 using a Model TR-84B Vibrating Read Electrometer (manufactured by Takeda Riken Co.). The current value obtained one minute after impressing with 190 volts is used. A film having a volume resistivity of at least $10^{15}$ ($\Omega$-cm) is considered as being acceptable.

The heat resistance of the film is determined in the following manner. A film sample having a thickness of 75 microns and a width of 1.0 cm is left standing at a temperature of 180° C. in a Gear Aging Tester (manufactured by Tester Sangyo Co.). The number of hours that is required for the break elongation to decline to 50% of its original value is designated the heat resistance of the film. The film must have a heat resistance of at least 200 hours to be acceptable.

Examples 1 - 3 and Controls 1 - 3

A reaction vessel fitted with a stirrer and a rectifying column was charged with 100 parts of dimethyl terephthalate, 64 parts of ethylene glycol, 0.091 part (0.10 mol% based on the dimethyl terephthalate) of calcium acetate monohydrate and 0.136 part (0.40 mol% based on the dimethyl terephthalate) of lithium acetate, following which the ester-interchange reaction was carried out by heating the mixture for 3 hours at 130°–230° C., while removing the methanol formed. This was followed by adding to the ester-interchange product trimethyl phosphate in the amounts indicated in Table 1 and as the polycondensation catalyst also 0.045 part (0.03 mol% based on the dimethyl terephthalate) of antimony trioxide. The mixture was then heated for 30 minutes at normal atmospheric pressure to distill of the excess ethylene glycol, after which the pressure was gradually reduced, and in the final stages the mixture was heated for 3 hours at a temperature of 289° C. under reduced pressure of less than 1 mm Hg. The resulting polycondensation product was extruded into sheet form and then prepared into chips. The intrinsic viscosity $[\eta]$ of the so obtained fresh chips are shown in Table 1.

The above-described operation of preparing the polyester was repeated until there could be observed 20 units of foreign matter (catalyst scales) in the extruded sheet having the dimensions of 40 cm long, 40 cm wide and 0.2 cm thick. The number of batch repetitions up until the time 20 units of foreign matter has been observed is designated the "degree of foreign matter inhibition," which value is shown in Table 2. However, when less than 20 units of foreign matter is observed even after 80 batch repetitions, the "degree of foreign matter inhibition" is indicated as above 80, since the operation is terminated at 80 batches.

The fresh chips obtained in the above-described first batch were dried in customary manner and then melt-extruded to obtain a freshly extruded film which was then biaxially drawn to obtain a 75-micron-thick film. The heat resistance, color, static friction coefficient, volume resistivity, turbidity and degree of delamination of the so obtained film are shown in Table 2.

The so obtained film was remelted at 290° C. and, after cooling, was comminuted and prepared into reclaimed chips. Using the so obtained reclaimed chips, a biaxially drawn film was prepared by operating in the same manner as described above. The turbidity and the degree of delamination of a film obtained from these reclaimed chips are shown in Table 2.

As is apparent from Table 2, the formation of foreign matter was not noted in the case of Examples 1 - 3, and it was possible to carry out the continuous operation for a prolonged period of time. Moreover, the resulting films, regardless of whether they were obtained from the fresh chips or reclaimed chips, excellent in either case in their opacity, heat resistance, lubricity and electrical properties. In addition, they did not easily become delaminated. Hence, these films are most suitable for electrical purposes, and especially for slot liner use.

However, when $\dfrac{P}{0.5\,Ca + Li} < 0.10$ formation of foreign matter was extremely great, thus making it impossible to continue the operation over a prolonged period of time. Furthermore, even the film obtained from the fresh chips was yellow in color, and its heat resistance was poor. Again, when when $\dfrac{P}{0.5\,Ca + Li} > 0.55$ as in Controls 2 and 2, the opacity of the films obtained from the reclaimed chips was inadequate, and they also tended to become delaminated.

Examples 4 - 11 and Controls 4 - 5

The experiments were operated as in Example 1 but using the various phosphorus compounds indicated in Table 1 instead of the trimethyl phosphate used in Example 1. The results obtained are shown in Table 2.

As is apparent from Table 2, excellents results were obtained as in Examples 1 – 3 in the case of Examples 4 – 11. However, when, as in Controls 4 and 5, phosphoric acid and phosphorous acid were used, the opacities were inadequate in the case of both the films obtained from the fresh chips as well as the film obtained from the reclaimed chips, and they both tended to become delaminated.

Example 12 and Controls 6 – 10

Example 1 was repeated but using the calcium acetate, lithium acetate and trimethyl phosphate in the amounts indicated in Table 1. The results obtained are shown in Table 2.

As is apparent from Table 2, the results obtained in the case of Example 12 were, as in the case of Examples 1 – 3, excellent. However, when Ca>0.50 as in Control 6 and when Li>0.80 and moreover (0.5 Ca + Li)>1.00 as in Controls 7 and 8, the formation of foreign matter was excessive, with the consequence that it was impossible to continue the operation over a prolonged period of time. Films obtained in these cases also possessed the defect that difficulty was experienced in their drawing operation. On the other hand, when Li<0.10 as in Control 9 and (0.5 Ca + Li)<0.30 as in Control 10, the opacities of the film obtained from the fresh chips as well as the film obtained from the reclaimed chips was in both cases inadequate, and moreover they tended to become delaminated.

Example 13 and Controls 11 – 12

The experiments were carried out as in Example 1, except that the calcium acetate, lithium acetate and trimethyl phosphate used therein were used in the amounts indicated in Table 1 and there was added subsequent to the completion of the ester-interchange, along with the trimethyl phosphate, clay (clouding agent) in an amount indicated in Table 1 in the form of an ethylene glycol slurry. The results obtained are shown in Table 2.

As is apparent from Table 2, in the case of Example 13 excellent results were obtained as in the case with Examples 1 – 3. On the other hand, when (0.5 ca + Li)<0.30 as in Control 11 and Li<0.1 as in Control 12, while it was possible to obtain an adequate opacity by the use of a clouding agent such as clay, the film obtained from the fresh chips as well as the film obtained from the reclaimed chips were both extremely susceptible to delamination.

Example 14

Example 1 was repeated but using trimethyl phosphate instead of the trimethyl phosphate and using this trimethyl phosphite and lithium acetate in the amounts indicated in Table 1.

As shown in Table 2, excellent results comparable to those of Examples 1 – 3 were obtained.

Control 13

The experiment was carried out as in Example 1 but without using the calcium acetate and using the lithium acetate and trimethyl phosphate in the amounts indicated in Table 1.

As shown in Table 2, there was an excessive formation of foreign matter to make it impossible to continue the operation over a prolonged period of time. Furthermore, even the film obtained from the fresh chips was discolored as well as poor in its heat resistance. In addition, the film was susceptible to delamination.

Control 14

Example 1 was repeated but using manganese acetate tetrahydrate instead of the calcium acetate, this manganese acetate and the lithium acetate, antimony trioxide and trimethyl phosphate being used in the amounts indicated in Table 1.

As shown in Table 2, even the film obtained from the fresh chips was poor in its heat resistance. On the other hand, the film obtained from the reclaimed chips was extremely inadequate in its opacity as well as susceptible to delamination.

Control 15

Example 1 was repeated but without using the lithium acetate and using the calcium acetate and trimethyl phosphate in the amounts indicated in Table 1.

As shown in Table 2, the degree of foreign matter inhibition was 62 batches. Further, even the film obtained from the fresh chips was inferior in its heat resistance and opacity, as well as was susceptible to delamination.

Control 16

The experiment was carried out exactly as in Example 1 but carrying out the ester-interchange reaction using only the calcium acetate catalyst in the amount indicated in Table 1, the addition of the antimony trioxide, lithium acetate and trimethyl phosphate in the amounts indicated in Table 1 being made after substantial completion of the ester-interchange reaction.

As shown in Table 2, the amount formed of the foreign matter was excessive, with the consequence that continuous operation over a prolonged period was impossible. Further, while the film obtained from the fresh chips had a considerably high opacity and was not easily delaminated, the film obtained from the reclaimed chips was inadequate in its opacity and susceptible to delamination.

Table 1

|  |  | Lithium acetate (mol %) | Calcium acetate (mol %) | Manganese acetate (mol %) | Antimony trioxide (mol %) | Phosphorus Compound Class | Phosphorus Compound Amount (mol%) | Clouding agent (part) | Poly- 0.5Ca+Li | P / 0.5Ca+Li | ester [n] |
|---|---|---|---|---|---|---|---|---|---|---|---|
| Control | 1 | 0.40 | 0.10 | — | 0.03 | trimethyl phosphate | 0.02 | — | 0.45 | 0.04 | 0.655 |
| Example | 1 | 0.40 | 0.10 | — | 0.03 | '' | 0.07 | — | 0.45 | 0.16 | 0.652 |
| Example | 2 | 0.40 | 0.10 | — | 0.03 | '' | 0.16 | — | 0.45 | 0.36 | 0.650 |
| Example | 3 | 0.40 | 0.10 | — | 0.03 | '' | 0.23 | — | 0.45 | 0.51 | 0.645 |
| Control | 2 | 0.40 | 0.10 | — | 0.03 | '' | 0.29 | — | 0.45 | 0.64 | 0.638 |
| Control | 3 | 0.40 | 0.10 | — | 0.03 | '' | 0.50 | — | 0.45 | 1.11 | 0.630 |
| Example | 4 | 0.40 | 0.10 | — | 0.03 | trimethyl phosphite | 0.16 | — | 0.45 | 0.36 | 0.648 |
| Example | 5 | 0.40 | 0.10 | — | 0.03 | triphenyl | 0.16 | — | 0.45 | 0.36 | 0.651 |

Table 1-continued

|  |  | Lithium acetate (mol %) | Calcium acetate (mol %) | Manganese acetate (mol %) | Antimony trioxide (mol %) | Phosphorus Compound Class | Amount (mol%) | Clouding agent (part) | Poly- 0.5Ca+Li | P / (0.5Ca+Li) | ester [n] |
|---|---|---|---|---|---|---|---|---|---|---|---|
| Example | 6 | 0.40 | 0.10 | — | 0.03 | phosphate triphenyl phosphite | 0.16 | — | 0.45 | 0.36 | 0.650 |
| Example | 7 | 0.40 | 0.10 | — | 0.03 | dimethyl phosphate | 0.16 | — | 0.45 | 0.36 | 0.645 |
| Example | 8 | 0.40 | 0.10 | — | 0.03 | monomethyl phosphate | 0.16 | — | 0.45 | 0.36 | 0.646 |
| Example | 9 | 0.40 | 0.10 | — | 0.03 | dimethyl phosphite | 0.16 | — | 0.45 | 0.36 | 0.645 |
| Example | 10 | 0.40 | 0.10 | — | 0.03 | mnomethyl phosphite | 0.16 | — | 0.45 | 0.36 | 0.647 |
| Example | 11 | 0.040 | 0.10 | — | 0.03 | dimethyl-hydroxy-ethyl phosphate | 0.16 | — | 0.45 | 0.36 | 0.646 |
| Control | 4 | 0.40 | 0.10 | — | 0.03 | phosphoric acid | 0.16 | — | 0.45 | 0.36 | 0.651 |
| Control | 5 | 0.40 | 0.10 | — | 0.03 | phosphorous acid | 0.16 | — | 0.45 | 0.36 | 0.650 |
| Example | 12 | 0.20 | 0.40 | — | 0.03 | trimethyl phosphate | 0.14 | — | 0.40 | 0.35 | 0.651 |
| Control | 6 | 0.40 | 0.70 | — | 0.03 | " | 0.26 | — | 0.75 | 0.35 | 0.648 |
| Control | 7 | 1.00 | 0.48 | — | 0.03 | " | 0.41 | — | 1.24 | 0.33 | 0.652 |
| Control | 8 | 1.20 | 0.20 | — | 0.03 | " | 0.42 | — | 1.30 | 0.32 | 0.648 |
| Control | 9 | 0.06 | 0.48 | — | 0.03 | " | 0.11 | — | 0.30 | 0.37 | 0.651 |
| Control | 10 | 0.20 | 0.10 | — | 0.03 | " | 0.09 | — | 0.25 | 0.36 | 0.649 |
| Example | 13 | 0.40 | 0.10 | — | 0.03 | " | 0.23 | 0.08 | 0.45 | 0.51 | 0.646 |
| Control | 11 | 0.20 | 0.10 | — | 0.03 | " | 0.09 | 0.50 | 0.25 | 0.36 | 0.651 |
| Control | 12 | 0.06 | 0.4 | — | 0.03 | " | 0.11 | 0.50 | 0.30 | 0.37 | 0.649 |
| Example | 14 | 0.80 | 0.10 | — | 0.03 | trimethyl phosphite | 0.38 | — | 0.85 | 0.45 | 0.646 |
| Control | 13 | 1.00 | — | — | 0.03 | trimethyl phosphate | 0.32 | — | 1.00 | 0.40 | 0.647 |
| Control | 14 | 0.44 | — | 0.07 | 0.02 | " | 0.28 | — | 0.44 | 0.64 | 0.645 |
| Control | 15 | — | 0.48 | — | 0.03 | " | 0.11 | — | 0.24 | 0.46 | 0.648 |
| Control | 16 | 0.91* | 0.14 | — | 0.03 | " | 0.24 | — | 0.98 | 0.24 | 0.650 |

*Added after the ester-interchange reaction.

Table 2

|  |  | Degree of foreign matter inhibition (batch) | Film obtained From Fresh Chips | | | | | | Film Obtained From Reclaimed Chips | |
|---|---|---|---|---|---|---|---|---|---|---|
|  |  |  | Heat resistance (hr) | Color (class) | Static friction coefficient | Volume resistivity chips ($\Omega$-cm) | Turbidity (%) | Delamination resistance (grade) | Turbidity (%) | Delamination resistance (grade) |
| Control | 1 | 39 | 120 | 4 | 0.32 | $0.8 \times 10^{17}$ | 70 | 1 | 62 | 1 |
| Example | 1 | above 80 | 220 | 3 | 0.34 | $1.1 \times 10^{17}$ | 58 | 1 | 50 | 1 |
| Example | 2 | above 80 | 250 | 3 | 0.36 | $1.2 \times 10^{17}$ | 49 | 1 | 40 | 1 |
| Example | 3 | above 80 | 300 | 3 | 0.37 | $1.3 \times 10^{17}$ | 45 | 1 | 35 | 1 |
| Control | 2 | above 80 | 335 | 3 | 0.40 | $1.4 \times 10^{17}$ | 35 | 1 | 8 | 2 |
| Control | 3 | above 80 | 350 | 3 | 0.37 | $1.4 \times 10^{17}$ | 45 | 1 | 15 | 2 |
| Example | 4 | above 80 | 255 | 3 | 0.36 | $1.2 \times 10^{17}$ | 48 | 1 | 40 | 1 |
| " | 5 | above 80 | 256 | 3 | 0.36 | $1.2 \times 10^{17}$ | 48 | 1 | 40 | 1 |
| " | 6 | above 80 | 260 | 3 | 0.36 | $1.2 \times 10^{17}$ | 47 | 1 | 40 | 1 |
| " | 7 | above 80 | 240 | 3 | 0.36 | $1.2 \times 10^{17}$ | 48 | 1 | 40 | 1 |
| " | 8 | above 80 | 235 | 3 | 0.37 | $1.1 \times 10^{17}$ | 45 | 1 | 39 | 1 |
| " | 9 | above 80 | 236 | 3 | 0.36 | $1.1 \times 10^{17}$ | 47 | 1 | 40 | 1 |
| " | 10 | above 80 | 231 | 3 | 0.37 | $1.1 \times 10^{17}$ | 45 | 1 | 38 | 1 |
| " | 11 | above 80 | 230 | 3 | 0.37 | $1.1 \times 10^{17}$ | 46 | 1 | 39 | 1 |
| Control | 4 | above 80 | 203 | 2 | 0.81 | $0.9 \times 10^{17}$ | 16 | 2 | 10 | 2 |
| Control | 5 | above 80 | 211 | 2 | 0.42 | $1.0 \times 10^{17}$ | 25 | 2 | 18 | 2 |
| Example | 12 | above 80 | 225 | 3 | 0.39 | $1.1 \times 10^{17}$ | 41 | 1 | 34 | 1 |
| Control | 6 | 19 | 232 | 3 | 0.34 | $1.1 \times 10^{17}$ | 61 | 1 | 53 | 1 |
| " | 7 | 27 | 200 | 3 | 0.32 | $1.0 \times 10^{17}$ | 76 | 1 | 67 | 1 |
| " | 8 | 35 | 223 | 3 | 0.32 | $1.1 \times 10^{17}$ | 78 | 1 | 70 | 1 |
| " | 9 | 76 | 217 | 2 | 0.42 | $1.0 \times 10^{17}$ | 22 | 2 | 15 | 2 |
| " | 10 | above 80 | 265 | 2 | 0.42 | $1.2 \times 10^{17}$ | 21 | 2 | 14 | 2 |
| Example | 13 | above 80 | 295 | 3 | 0.35 | $1.3 \times 10^{17}$ | 53 | 1 | 43 | 1 |
| Control | 11 | above 80 | 250 | 3 | 0.35 | $1.3 \times 10^{17}$ | 55 | 3 | 48 | 3 |
| Control | 12 | above 80 | 207 | 3 | 0.35 | $1.0 \times 10^{17}$ | 57 | 3 | 50 | 3 |
| Example | 14 | above 80 | 260 | 3 | 0.33 | $1.3 \times 10^{17}$ | 65 | 1 | 56 | 1 |
| Control | 13 | 50 | 157 | 4 | 0.36 | $0.8 \times 10^{17}$ | 50 | 2 | 40 | 2 |
| " | 14 | above 80 | 115 | 3 | 0.37 | $0.7 \times 10^{17}$ | 45 | 1 | 15 | 2 |
| " | 15 | 62 | 150 | 2 | 0.43 | $1.0 \times 10^{17}$ | 20 | 2 | 14 | 2 |
| " | 16 | 41 | 200 | 3 | 0.34 | $1.1 \times 10^{17}$ | 60 | 1 | 25 | 2 |

We claim:

1. In preparing a polyester by carrying out the ester-interchange reaction of a lower alkyl ester of terephthalic acid and a glycol and thereafter effecting the polycondensation reaction of the resulting product, the improvement for preparing a polymer for opaque film use which comprises carrying out said ester-interchange reaction in the presence of a calcium compound and a lithium compound having ester-interchange catalysis capacities in amounts satisfying all of the following relationships:

$$0.03 \leq Ca \leq 0.50 \qquad (1)$$

$$0.10 \leq Li \leq 0.80 \qquad (2)$$

$$0.30 \leq 0.5\,Ca + Li \leq 1.00 \qquad (3)$$

and $$0.10 \leq \frac{P}{0.5\,Ca + Li} \leq 0.55 \qquad (4)$$

wherein Ca, Li and P are respectively the mol percentages of calcium, lithium and phosphorus compounds based on the lower alkyl ester of terephthalic acid, and thereafter adding to the reaction system a phosphorus compound of the formula

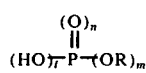 (5)

wherein R is a member selected from the group consisting of the alkyl, aryl and hydroxyalkyl groups, $n$ is selected from the class consisting of 0 and 1, $l$ is a whole number up to 2, including 0, $m$ is a whole number from 1 to 3, with the proviso that the sum of $l$ and $m$ is 3, in an amount satisfying said relationship (4), the addition being made at a point in the process up until completion of said polycondensation reaction.

2. In preparing a polyester by carrying out the ester-interchange reaction of a lower alkyl ester of terephthalic acid and a glycol and thereafter effecting the polycondensation reaction of the resulting product, the improvement for preparing a polymer for opaque film use which comprises carrying out said ester-interchange reaction in the presence of a calcium compound and a lithium compound having ester-interchange catalysis capacities, in amounts satisfying all of the following relationships:

$$0.05 \leq Ca \leq 0.40 \qquad (1')$$

$$0.20 \leq Li \leq 0.60 \qquad (2')$$

$$0.35 \leq 0.5\,Ca + Li \leq 0.80 \qquad (3')$$

and $$0.10 \leq \frac{P}{0.5\,Ca + Li} \leq 0.55 \qquad (4)$$

wherein Ca, Li and P are respectively the mol percentages of calcium, lithium and phosphorus compounds based on the lower alkyl ester of terephthalic acid, and thereafter adding to the reaction system a phosphorus compound of the formula

 (5)

wherein R is a member selected from the group consisting of the alkyl, aryl and hydroxyalkyl group, $n$ is selected from the class consisting of 0 and 1, $l$ is a whole number up to 2, including 0, $m$ is a whole number from 1 to 3, with the proviso that the sum of $l$ and $m$ is 3, in an amount satisfying said relationship (4), the addition being made at a point in the process up until completion of said polycondensation reaction.

3. The process of claim 1 which comprises adding said phosphorus compound at a point where said ester-interchange reaction has been substantially completed.

4. The process of claim 1 wherein said polyester is polyethylene terephthalate.

* * * * *